United States Patent
Singh

(10) Patent No.: US 9,965,232 B1
(45) Date of Patent: May 8, 2018

(54) SYSTEMS AND METHODS FOR AUTOMATICALLY VERIFYING DEFAULT PRINTING SELECTIONS

(71) Applicant: Symantec Corporation, Mountain View, CA (US)

(72) Inventor: Sarvesh Bahadur Singh, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 9 days.

(21) Appl. No.: 15/070,277

(22) Filed: Mar. 15, 2016

(51) Int. Cl.
*G06F 15/173* (2006.01)
*G06F 3/12* (2006.01)

(52) U.S. Cl.
CPC .......... *G06F 3/1238* (2013.01); *G06F 3/1205* (2013.01); *G06F 3/1222* (2013.01); *G06F 3/1232* (2013.01); *G06F 3/1255* (2013.01); *G06F 3/1287* (2013.01); *G06F 3/1292* (2013.01)

(58) Field of Classification Search
None
See application file for complete search history.

(56) References Cited

U.S. PATENT DOCUMENTS

| 8,786,875 | B1 * | 7/2014 | Khafizova | G06F 3/1204 358/1.13 |
| 2005/0024672 | A1 * | 2/2005 | Guster | G06F 3/1212 358/1.14 |
| 2009/0113041 | A1 * | 4/2009 | Andreazzi | H04W 4/02 709/224 |
| 2012/0326962 | A1 * | 12/2012 | Asai | H04N 1/00474 345/156 |
| 2013/0091539 | A1 * | 4/2013 | Khurana | G06F 21/552 726/1 |

OTHER PUBLICATIONS

Hoffman, Chris, "Wireless Printing Explained: AirPrint, Google Cloud Print, iPrint, ePrint, and More", http://www.howtogeek.com/176421/wireless-printing-explained-airprint-google-cloud-print-iprint-eprint-and-more/, as accessed Feb. 10, 2016, (Nov. 28, 2013).
"Printer (computing)", https://en.wikipedia.org/wiki/Printer_(computing), as accessed Feb. 10, 2016, Wikipedia, (Oct. 26, 2008).

(Continued)

*Primary Examiner* — Andrew H Lam
(74) *Attorney, Agent, or Firm* — FisherBroyles, LLP

(57) ABSTRACT

The disclosed computer-implemented method for automatically verifying default printing selections may include (1) receiving a digital printing request from a user of the computing device to print a document, (2) identifying, in response to receiving the digital printing request, a default printer to which the computing device is configured to transmit instructions to print the document, (3) determining that the default printer is not within a designated area of the computing device, (4) in response to the determination, presenting the user with a prompt that allows the user to affirmatively select the default printer to print the document or to select a different printer to print the document. Various other methods, systems, and computer-readable media are also disclosed.

20 Claims, 6 Drawing Sheets

(56) References Cited

OTHER PUBLICATIONS

"Page description language", https://en.wikipedia.org/wiki/Page_description_language, as accessed Feb. 10, 2016, Wikipedia, (Jan. 27, 2004).
"Peripheral", https://en.wikipedia.org/wiki/Peripheral, as accessed Feb. 10, 2016, Wikipedia, (Jan. 17, 2004).
Beal, Vangie, "printer driver", http://www.webopedia.com/TERM/P/printer_driver.html, as accessed Feb. 10, 2016, (Aug. 18, 2002).
"Cirrato", https://www.cirrato.com/, as accessed Feb. 10, 2016, (Jun. 29, 2009).

\* cited by examiner

SYSTEMS AND METHODS FOR AUTOMATICALLY VERIFYING DEFAULT PRINTING SELECTIONS

BACKGROUND

Current technologies allow computers to wirelessly transmit printing instructions to various printers. Often, an operating system and/or a program that enables printing (such as a word processor) may be configured with a default printer. In such instances, print jobs originating from the computer may be automatically sent to the default printer. While this feature may be very useful, the default setting may sometimes lead to an annoying or inefficient result. For example, a portable computer may select a default printer for a print job even when the default printer is not nearby. This may be especially frustrating to users if the print job is lengthy (e.g., several hundred pages) or if the default printer is a community printer used by multiple users.

In addition to potentially triggering inefficiency and frustration, a default printer setting may also trigger a security risk. For example, a default printer setting may create a security risk if a document to be printed includes sensitive information. In this example, printing to a remote default printer may increase a risk of sensitive data loss by presenting any individual who has access to the printer with access to the document, even though these individuals may not be authorized to access the sensitive information. This risk may be especially pronounced if the printer is located in an unsafe location. Accordingly, the instant disclosure identifies a need for improved systems and methods for preventing default printing settings from leading to unwanted printer selections.

SUMMARY

As will be described in greater detail below, the instant disclosure describes various systems and methods for automatically verifying default printing selections. In one example, a computer-implemented method for automatically verifying default printing selections may include (1) receiving a digital printing request from a user of the computing device to print a document, (2) identifying, in response to receiving the digital printing request, a default printer to which the computing device is configured to transmit instructions to print the document, (3) determining that the default printer is not within a designated area of the computing device, and (4) presenting, in response to the determination, the user with a prompt that allows the user to affirmatively select the default printer to print the document or to select a different printer to print the document.

In some examples, the disclosed method may determine that the default printer is not included within the designated area by determining that the default printer is not within the computing device's local area network. In one example, determining that the default printer is not within the computing device's local area network may include (1) identifying a range of IP addresses associated with the computing device's local area network and (2) determining that an IP address of the default printer falls outside the range of IP addresses associated with the computing device's local area network. Identifying this range of IP addresses may include (1) identifying an IP address of the computing device and (2) defining the range of IP addresses as IP addresses that are within a predetermined distance from the IP address of the computing device.

In some examples, the disclosed method may further include, after presenting the user with the prompt, receiving digital input from the user. In one embodiment, this digital input may include a selection of a different printer for printing the document. In this embodiment, the disclosed method may also include, in response to receiving the digital input, transmit instructions to print the document to the different printer instead of transmitting instructions to the default printer. In an alternate embodiment, the digital input received from the user may include a selection of the default printer for printing the document. In this embodiment, the disclosed method may include, in response to receiving the digital input, transmitting instructions to print the document to the default printer.

In some examples, the disclosed method may further include, upon receiving the digital request, determining that the document includes sensitive information. In these examples, the identifying, determining, and presenting steps may be performed in response to determining that the document includes the sensitive information.

In one embodiment, the disclosed method may further include determining that the default printer is located in a location that has been designated as potentially unsafe. In this embodiment, the identifying, determining, and presenting steps may be performed in response to determining that the default printer is located in the location that has been designated as potentially unsafe.

In one embodiment, the disclosed method may further include, upon receiving the digital request, determining that the document includes more than a threshold number of pages to be printed. In this embodiment, the identifying, determining, and presenting steps may be performed in response to determining that the document includes more than the threshold number of pages to be printed.

In some examples, the computing device may represent a mobile computing device. In these examples, the digital request may include a request to wirelessly transmit instructions to the default printer for the default printer to print the document.

In one embodiment, a system for implementing the above-described method may include (1) a receiving module, stored in memory, that receives a digital printing request from a user of a computing device to print a document, (2) an identification module, stored in memory, that identifies, in response to receiving the digital printing request, a default printer to which the computing device is configured to transmit instructions to print the document, (3) a determination module, stored in memory, that determines that the default printer is not within a designated area of the computing device, (4) a presenting module, stored in memory, that, in response to the determination, presents the user with a prompt that allows the user to affirmatively select the default printer to print the document or to select a different printer to print the document, and (5) at least one physical processor configured to execute the receiving module, the identification module, the determination module, and the presenting module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive a digital printing request from a user of the computing device to print a document, (2) identify, in response to receiving the digital printing request, a default printer to which the computing device is configured to transmit instructions to print the document, (3) determine that the default printer is not within a designated area of the computing device, and (4) present, in response to the determination, the user with a prompt that allows the user to affirmatively select the default printer to print the document or to select a different printer to print the document.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
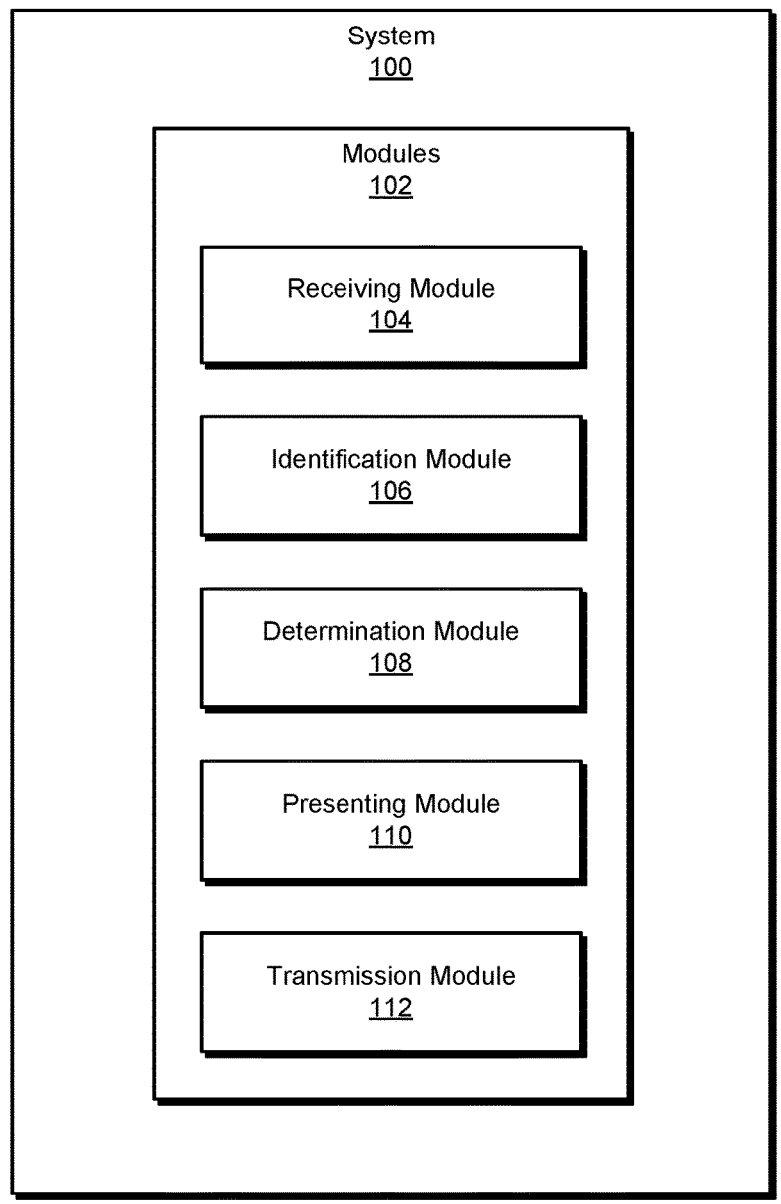
FIG. 1 is a block diagram of an exemplary system for automatically verifying default printing selections.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for automatically verifying default printing selections. As will be explained in greater detail below, the disclosed systems and methods may alter computer settings associated with printing to a default computer such that the computer automatically requests user input verifying the default printer selection whenever the default printer is not within the local area network of the user's computer. Such an alteration may prevent the computer from automatically defaulting to a printer when the user has transported the computer outside a physical area surrounding the printer, allowing for a new printer selection that is safer and more useful.

Figure 2:
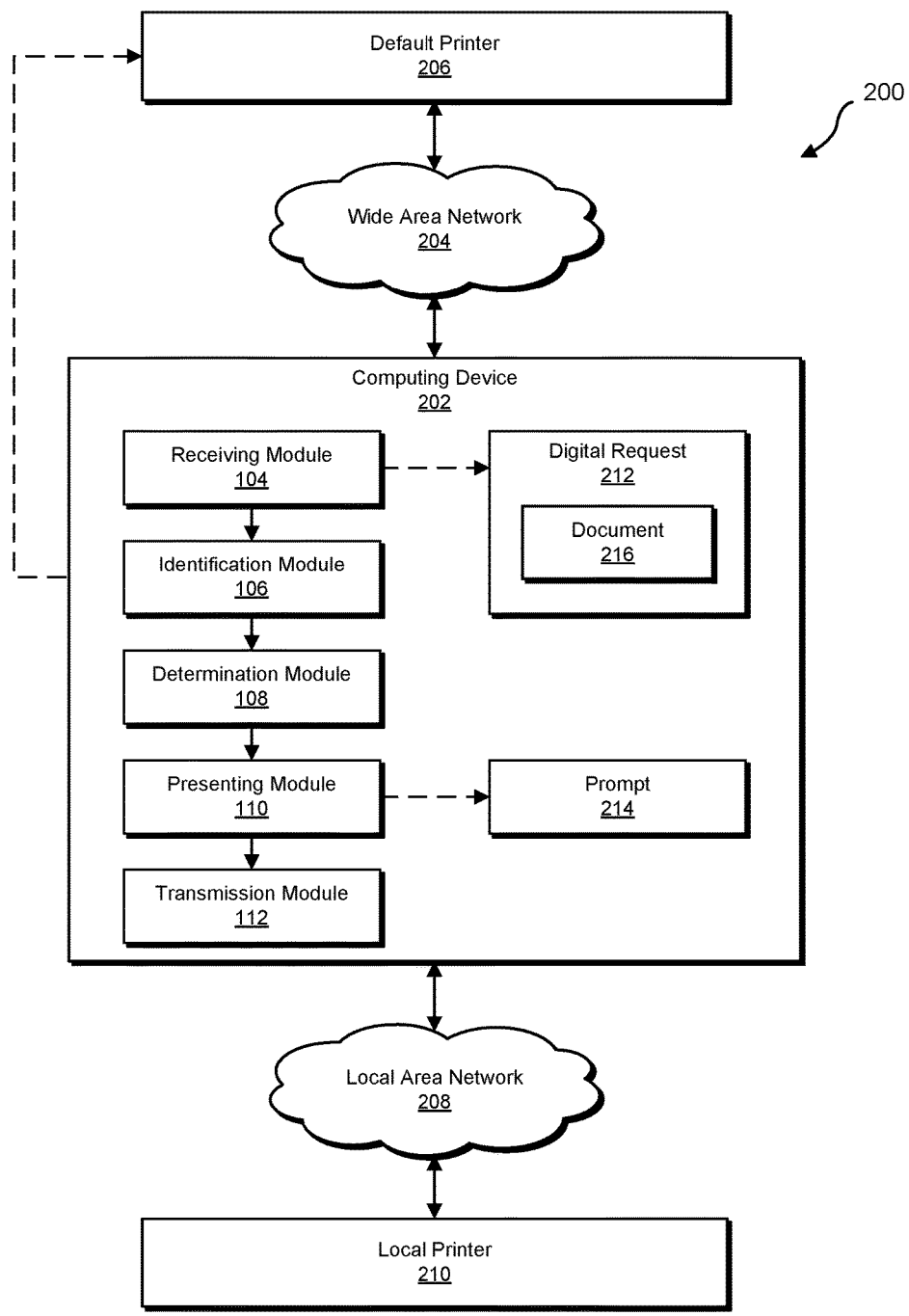
FIG. 2 is a block diagram of an additional exemplary system for automatically verifying default printing selections.

The following will provide, with reference to FIGS. 1-2, detailed descriptions of exemplary systems for automatically verifying default printing selections. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for automatically verifying default printing selections. As illustrated in this figure, exemplary system 100 may include one or more modules 102 for performing one or more tasks. For example, and as will be explained in greater detail below, exemplary system 100 may include a receiving module 104 that may receive a digital printing request from a user of a computing device to print a document. Exemplary system 100 may additionally include an identification module 106 that may identify, in response to receiving the digital printing request, a default printer to which the computing device is configured to transmit instructions to print the document.

Exemplary system 100 may also include a determination module 108 that may determine that the default printer is not within a designated area of the computing device. Exemplary system 100 may additionally include a presenting module 110 that may, in response to the determination, present the user with a prompt that allows the user to affirmatively select the default printer to print the document or to select a different printer to print the document.

In some examples, exemplary system 100 may further include a transmission module 112 that may transmit printing instructions to the default printer and/or to the different printer. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with (1) a default printer 206 via a wide area network 204 and/or (2) a local printer 210 via a local area network 208. In one example, computing device 202 may be programmed with one or more of modules 102.

In one embodiment, one or more of modules 102 from FIG. 1 may, when executed by at least one processor of computing device 202, enable computing device 202 to automatically verify default printing selections. For example, and as will be described in greater detail below, receiving module 104 may receive a digital request 212 from a user of computing device 202 to print a document 216. Identification module 106 may identify, in response to receiving digital request 212, default printer 206 (to which computing device 202 is configured to transmit instructions to print document 216). Determination module 108 may determine that default printer 206 is not within a designated area of computing device 202. Presenting module 110 may present, in response to the determination, the user with a prompt 214 that allows the user to affirmatively select the default printer to print the document or to select a different printer to print the document. Also, in some embodiments, transmission module 112 may transmit instructions to print document 216 to default printer 206 and/or local printer 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device. In some examples, computing device 202 may include an operating system that has a default printer setting. Additionally or alternatively, computing device 202 may include a program that facilitates printing that has a default printer setting.

Wide area network 204 generally represents any medium or architecture capable of facilitating communication or data transfer that extends over a large geographical distance. Examples of network 204 include, without limitation, an intranet, the Internet, Power Line Communications (PLC), a cellular network (e.g., a Global System for Mobile Communications (GSM) network), exemplary network architecture 600 in FIG. 6, or the like.

In some examples, wide area network 204 may represent a wide area network 204 that is built for a particular enterprise, such as an enterprise that manages computing device 202 and/or an individual using computing device 202. Wide area network 204 may facilitate communication or data transfer using wireless or wired connections. In one embodiment, wide area network 204 may facilitate communication between computing device 202 and default printer 206. In some examples, wide area network 204 may connect distinct local area networks together. For example, wide area network 204 may connect local area network 208 and a local area network associated with default printer 206.

Local area network 208 generally represents any medium or architecture capable of facilitating communication or data transfer within a limited area such as an office building, a residence, etc. In some examples, local area network 208 may include an intranet, a Personal Area Network (PAN), exemplary network architecture 600 in FIG. 6, or the like. Local area network 208 may facilitate communication or data transfer using wireless or wired connections. In one embodiment, network 204 may facilitate communication between computing device 202 and local printer 210.

Default printer 206 and local printer 210 generally represent any type or form of peripheral machine capable of (1) receiving graphics and/or text information (e.g., from a computing device such as computing device 202) and (2) creating a persistent human readable representation of the received graphics and/or text. The graphics and/or text information may take any suitable form. For example, the graphics and/or text information may take the form of a bitmapped image, plain text, and/or commands (e.g., specifying the appearance of a printed page) that are written in a page description language such as PostScript.

In some embodiments, default printer 206 and/or local printer 210 may represent wireless-capable printers. In additional or alternative embodiments, default printer 206 and/or local printer 210 may represent BLUETOOTH-capable printers. In some examples, default printer 206 and/or local printer 210 may represent laser printers and/or inkjet printers.

In some examples, default printer 206 may represent a printer that has been selected by a computing device to print a document. In one example, computing device 202 may have a default setting to automatically select default printer 206 for printing whenever a printing job is initiated from computing device 202. In another example, computing device 202 may select default printer 206 based on a user manually selecting default printer 206 as the destination printer for a print job. Thus, the disclosed systems and methods may help prevent inadvertent printer selection both in cases where the selection is made by default and in cases where the selection is made by an absent-minded user.

Figure 3:
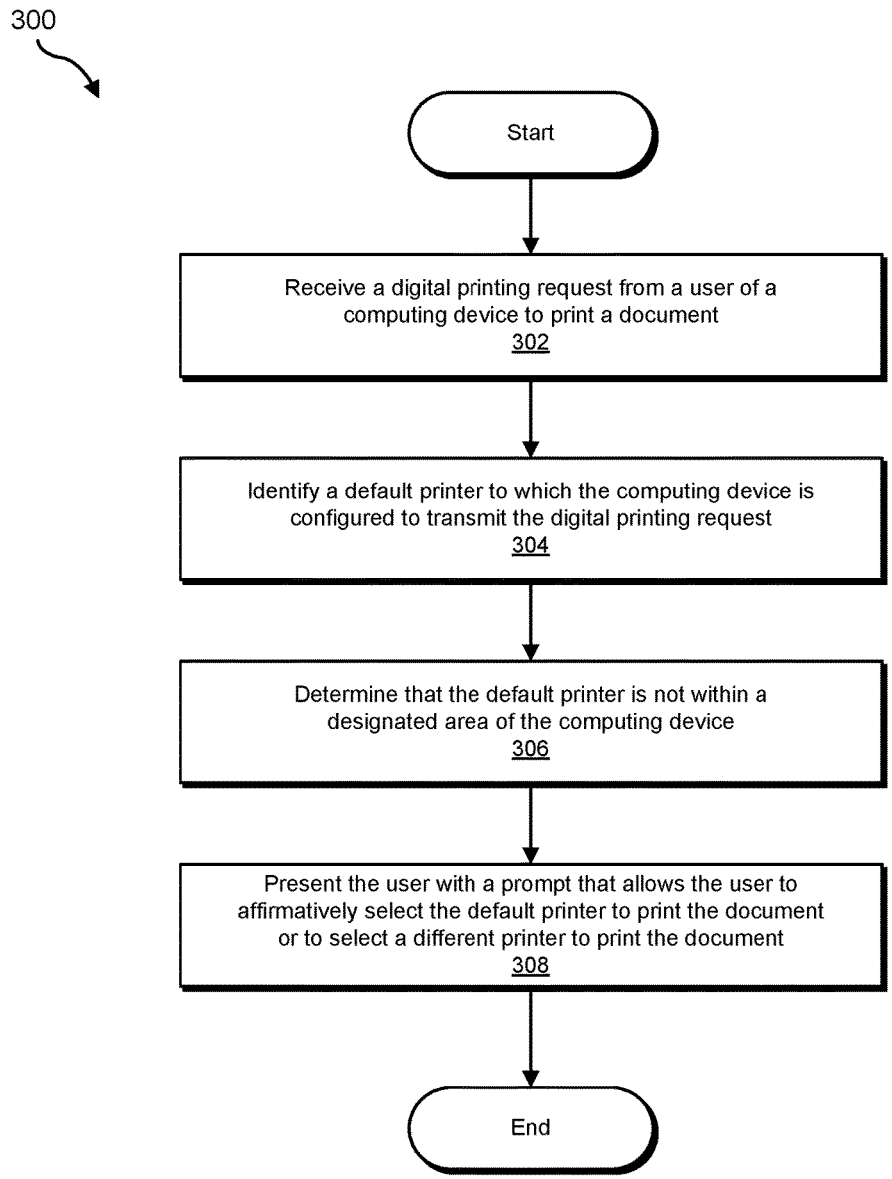
FIG. 3 is a flow diagram of an exemplary method for automatically verifying default printing selections.

FIG. 3 is a flow diagram of an exemplary computer-implemented method 300 for automatically verifying default printing selections. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may receive a digital printing request from a user of a computing device to print a document. For example, receiving module 104 may, as part of computing device 202 in FIG. 2, receive a digital request 212 from a user of computing device 202 to print document 216.

Receiving module 104 may receive digital request 212 in any suitable manner. In some examples, receiving module 104 may receive digital request 212 from a peripheral auxiliary device, such as a computer mouse and/or a keyboard connected to computing device 202. In these examples, digital request 212 may represent input received from the user via the peripheral auxiliary device. For example, digital request 212 may take the form of a mouse click corresponding to a print icon or of "Cntrl-P" submitted via a keyboard.

In some examples, receiving module 104 may (e.g., upon receiving digital request 212) analyze one or more portions of document 216. For example, receiving module 106 may scan document 216 for particular words or phrases according to a security policy directive. In some such examples, receiving module 104 may determine, based on the analysis, that document 216 includes sensitive information. For example, receiving module 104 may determine that document 216 includes financial information, patient information, trade secret information, confidential company information, etc. In additional or alternative examples, receiving module 104 may identify a number of pages in document 216 to be printed. In these examples, receiving module 104 may also determine whether the identified number of pages surpasses a certain threshold.

In some examples in which receiving module 104 analyzes portions of document 216, the systems and methods disclosed herein may determine whether to perform steps 304, 306, and 308 based on information obtained from the analysis. For example, the disclosed systems and methods may include a policy to only perform steps 304, 306, and 308 if receiving module 104 determines that document 216 includes sensitive information. Similarly, the disclosed systems and methods may include a policy to only perform steps 304, 306, and 308 if receiving module 104 determines that document 216 includes a number of pages that surpasses a certain threshold.

At step 304, one or more of the systems described herein may identify, in response to receiving the digital printing request, a default printer to which the computing device is configured to transmit instructions for printing the document. For example, identification module 106 may, as part of computing device 202 in FIG. 2 and in response to receiving module 104 receiving digital request 212, identify default printer 206.

Identification module 106 may identify default printer 206 in any suitable manner. In some examples, identification module 106 may determine that an operating system of computing device 202 includes a default setting to transmit printing instructions to default printer 206 whenever computing device 202 receives a printing directive. In these examples, identification module 106 may identify default printer 206 based on the operating system's default setting. Similarly, identification module 106 may determine that a program used to prepare document 216 for printing (such as a word processor installed on computing device 202) is configured to transmit printing instructions to default printer 206 whenever the program receives a printing request. In these examples, identification module 106 may identify default printer 206 based on the program's default setting. In other examples, identification module 106 may identify default printer 206 based on user input selecting default printer 206.

In one example, the disclosed systems and methods may include a policy that designates certain printers as "safe." As used herein, a "safe" printer refers to a printer located in a geographic location that may be unlikely to give rise to data loss if a sensitive document is printed to that location and left unattended. In this example, identification module 106 may (in addition to identifying default printer 206) also determine whether default printer 206 has been designated as safe in the policy. If default printer 206 has been designated as safe, the disclosed systems and methods may transmit instructions to default printer 206 to print document 216 without performing steps 306 and 308 (e.g., without verifying the printer selection).

By contrast, if default printer 206 has not been designated as safe in the policy (or if default printer 206 has been designated as unsafe in the policy), the disclosed systems and methods may proceed to perform steps 306 and 308. As used herein, an "unsafe" printer refers to a printer located in a geographic location that may be likely to give rise to data loss (e.g., a printer located in a crowded area such as an airport).

At step 306, one or more of the systems described herein may determine that the default printer is not within a designated area of the computing device. For example, determination module 108 may, as part of computing device 202 in FIG. 2, determine that default printer 206 is not within a designated area of computing device 202.

As used herein, the term "designated area" generally refers to a geographic region and/or a network area that is designated by the disclosed systems and methods (e.g., in a policy). In some examples, the disclosed systems and methods may designate the area based on a geographic radius. For example, the disclosed systems and methods may indicate (e.g., in a policy) that the designated area corresponds to the geographic area located within a two hundred meter radius of computing device 202. Additionally or alternatively, the disclosed systems and methods may designate the area based on a landmark. For example, the disclosed systems and methods may indicate that the designated area corresponds to a particular office building, a particular floor of an office building, or a particular home.

In additional or alternative examples, the disclosed systems and methods may designate the area based on a network construct that is correlated with a geographic region. For example, the disclosed systems and methods may indicate that the designated area is a local area network that encompasses computing device 202. In this example, the local area network may be said to be correlated with a geographic region based on a premise that computing devices in the same local area network are typically located in the same geographic location (e.g., within a four hundred meter circumference). Thus, the disclosed systems and methods may rely on a local area network as an indicator of physical proximity.

In examples where the designated area constitutes a local area network, determination module 108 may determine that default printer 206 is not within the local area network (i.e., local area network 208) in any suitable manner. In one example, determination module 108 may (1) identify local area network 208 and (2) determine that default printer 206 does not belong to local area network 208.

Determination module 108 may identify local area network 208 (i.e., the local area network of computing device 202) in various ways. In some examples, determination module 108 may identify local area network 208 by identifying a range of IP addresses associated with local area network 208. In one such example, determination module 108 may identify the IP address of computing device 202 and define the local area network of computing device 202 as computing devices with IP addresses that are no more than a predetermined distance from the IP address of computing device 202. In one embodiment, the predetermined distance may be based on a subnet mask of computing device 202.

After identifying local area network 208, determination module 108 may determine that default printer 206 does not belong to local area network 208. In one example, determination module 108 may make this determination in two steps. First, determination module 108 may identify an IP address of default printer 206. The IP address of default printer 206 may be identified in any suitable manner. For example, determination module 108 may obtain the IP address of default printer 206 from TCP/IP port information obtained from properties of default printer 206 maintained by computing device 202. Second, determination module 108 may determine that the IP address of default printer 206 falls outside the range of IP addresses associated with local area network 208. For example, determination module 108 may determine that the IP address of default printer 206 is more than the predetermined distance from the IP address of computing device 202.

In alternative embodiments, determination module 108 may determine that default printer 206 is a local printer. For example, determination module 108 may determine that default printer 206 belongs to local area network 208 and/or is located within a designated geographic region where computing device 202 is located. In some such embodiments, the disclosed systems and methods may print document 216 using default printer 206 without completing step 308. However, in embodiments where identification module 106 determines that default printer 206 is unsafe (as described above in connection with step 304), the disclosed systems and methods may, in some examples, proceed to step 308 notwithstanding the determination that default printer 206 is a local printer.

At step 308, one or more of the systems described herein may, in response to the determination, present the user with a prompt that allows the user to affirmatively select the default printer to print the document or to select a different printer to print the document. For example, presenting module 110 may, as part of computing device 202 in FIG. 2, present the user with prompt 214 that allows the user to select default printer 206 to print document 216 or to select a different printer (such as local printer 210) to print document 216.

Figure 4:
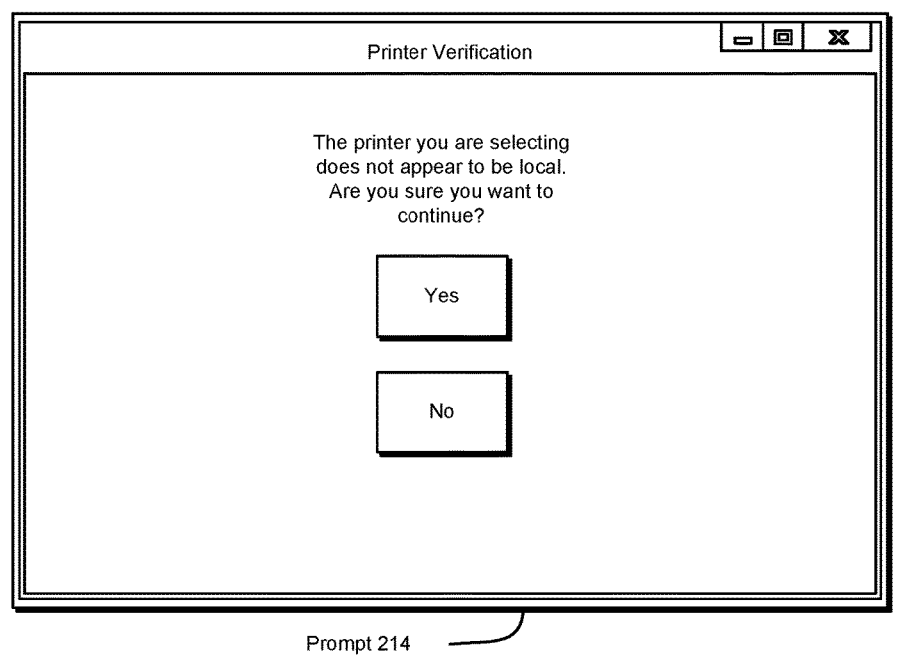
FIG. 4 is an exemplary prompt that may be used to present the user with a printer selection verification.

As used herein, the term "prompt" generally refers to any visual display element, such as an application popup dialogue box, that may be displayed on a screen of computing device 202. Presenting module 110 may present the user with a variety of prompts. In one example, presenting module 110 may present the user with prompt 214 as illustrated in FIG. 4. In this example, presenting module 110 may present the user with a printer verification window that cautions the user by displaying the message "The printer you are selecting does not appear to be local." The printer verification window may also ask the user "Are you sure you want to continue?" and allow the user to select a response (e.g., "Yes" or "No").

In one example, presenting module 110 may receive digital input from the user (e.g., via prompt 214) that includes a selection of a different printer for printing the document. For example, presenting module 110 may receive digital input from the user that selects local printer 210. In this example, transmission module 112 may transmit instructions to print document 216 to the printer selected by the user (i.e., local printer 210). In an alternate example, presenting module 110 may receive digital input from the user (e.g., via prompt 214) that affirms the selection of default printer 206 for printing document 216. In this example, transmission module 112 may transmit instructions to print document 216 to default printer 206 notwithstanding that default printer 206 is located in a remote location.

As explained above, the disclosed systems and methods may provide a mechanized solution for preventing computers from selecting printers outside of the computer's local area network (e.g., remote printing) in instances when such a selection would be useless or unsafe (e.g., because the user requesting the printing is not in a physical position to collect the printing result). In one embodiment, the disclosed systems and methods may, upon receiving a print request, determine whether (1) the computer that received the print request and (2) the printer to which the computer is configured to default for printing are in the same local area network.

If the printer is determined not to be in the same local area network as the computer, the disclosed systems and methods may present a user of the computer with a prompt. The prompt may ask the user to verify that remote printing is a wanted result. If input is received from the user that indicates that the remote printing is wanted, the disclosed systems and methods may transmit instructions to the default printer to perform the print request. If input is received from the user that indicates that the remote printing is not wanted, the printing will be cancelled and/or the user will be presented with an option to select another printer.

Preventing unwanted printer selection in this way may save various resources (e.g., print queue, network bandwidth, ink, paper, user frustration) and prevent the accidental disclosure of confidential information. Moreover, checking to see if a default printer is within the local area network of a user's computer is computationally a very lightweight operation. As such, identifying a potentially unwanted printer selection based on this lightweight operation provides an efficient printer verification system and method that may run on a computer without significantly consuming the computer's resources.

In some examples, the disclosed systems and methods may be aimed, in part, at preventing the potential risk of confidential data loss created when a computer defaults to selecting a remote printer for printing confidential documents, a risk which may be especially pronounced if the remote printer is located in a public location (such as an office) that is located in a different city or country. In these examples, the disclosed systems and methods may operate in accordance with a data-loss-prevention policy. For example, the disclosed systems and methods may be triggered by a determination that a document to be printed includes sensitive information. Thus, the disclosed systems and methods may provide a computer-based solution for preventing the accidental disclosure of confidential information caused by the default printing configuration of many computers.

Figure 5:
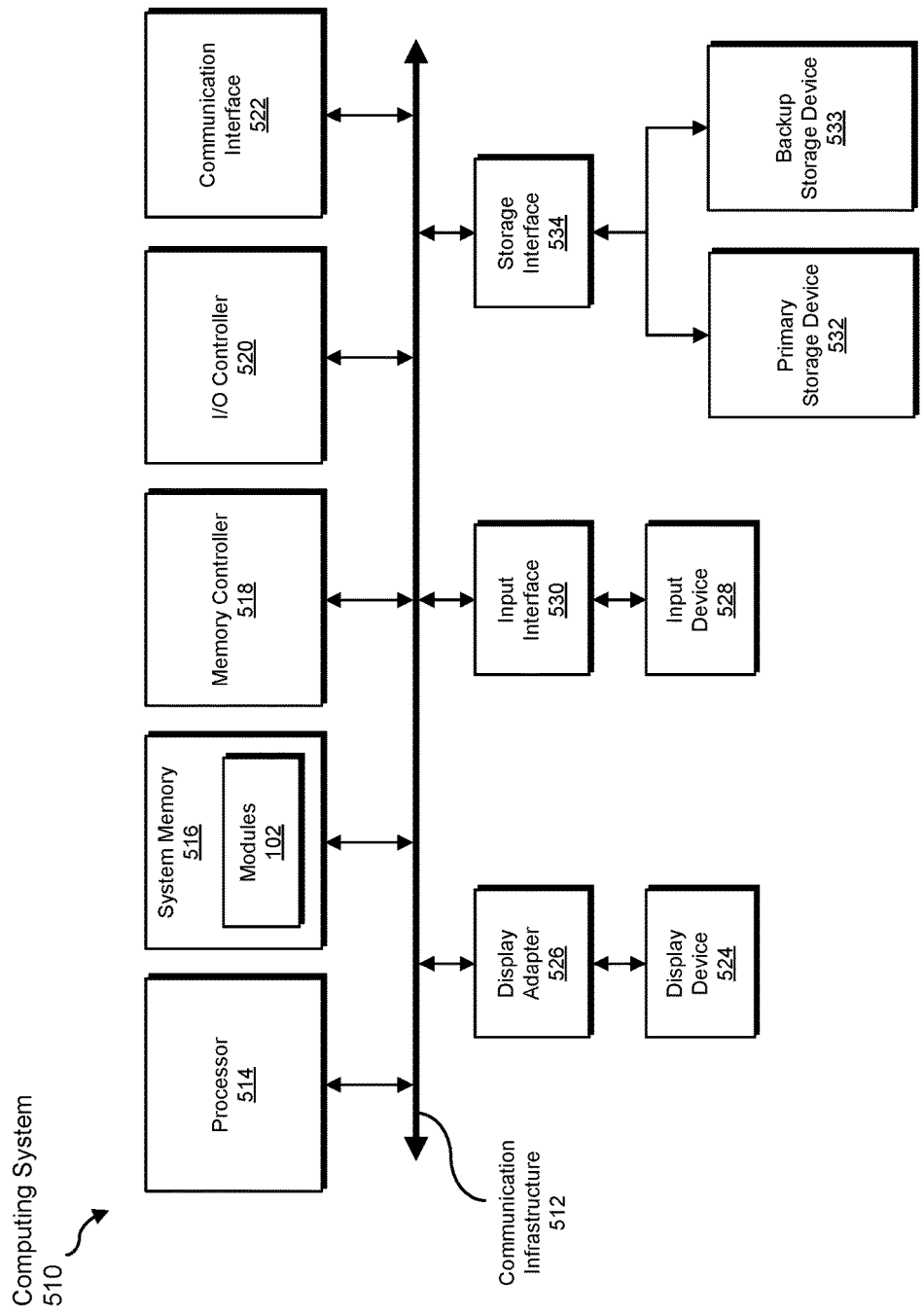
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512.

Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface.

In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
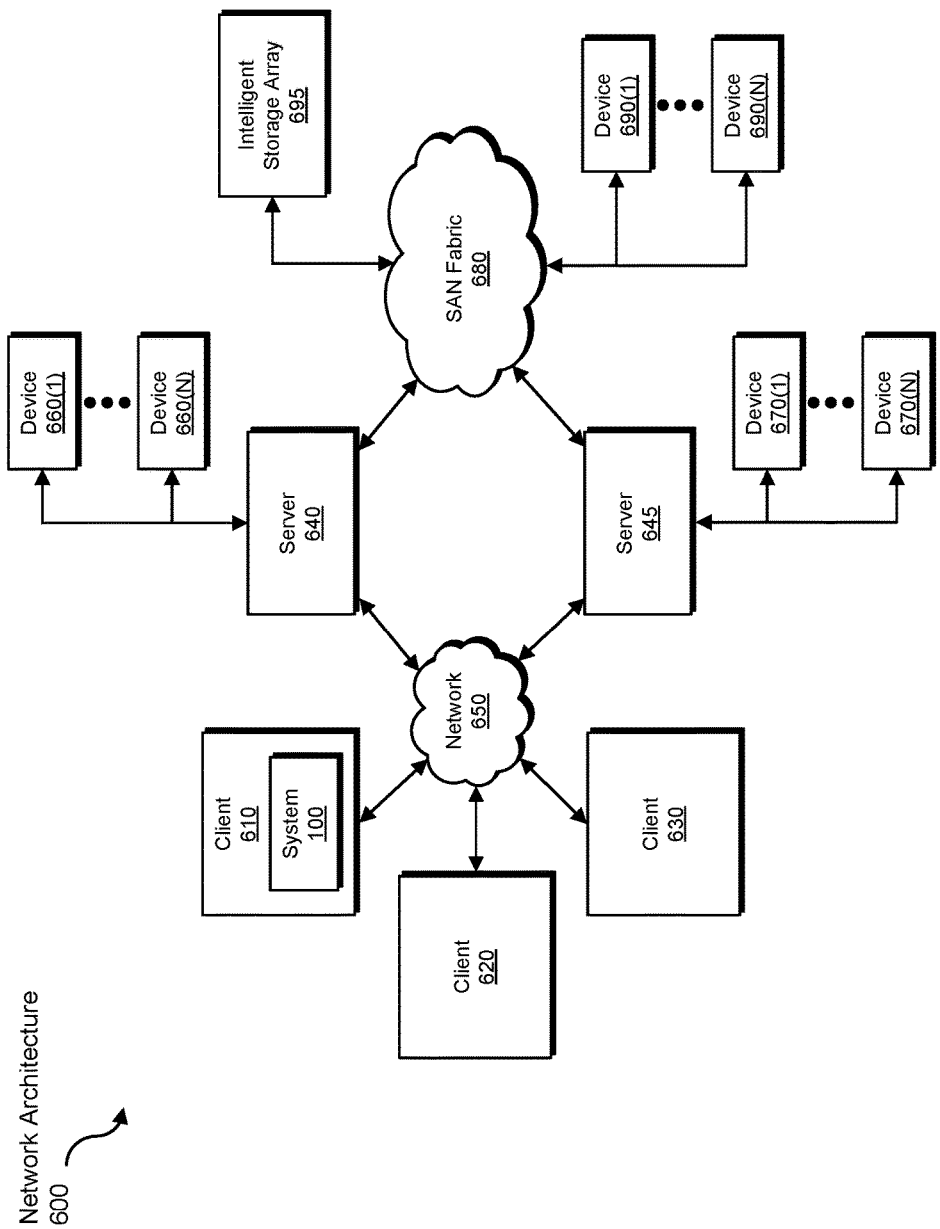
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for automatically verifying default printing selections.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all ora portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multitenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer.

As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like.

In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive input from a peripheral device that ordinarily triggers a default printer to print a document and transform that input into a prompt that requires verification input before allowing the default printer to receive printing instructions. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automatically verifying default printing selections, at least a portion of the method being performed by a computing device comprising at least one processor, the method comprising:
   receiving a digital printing request from a user of the computing device to print a document;
   identifying, in response to receiving the digital printing request, a default printer to which the computing device is configured to transmit instructions to print the document;
   identifying a policy, wherein:
   the policy comprises a printer-selection directive to:
   automatically print to the default printer without requesting a user verification whenever the default printer is within a designated area of the computing device; and
   verify a default printer selection prior to printing to the default printer whenever the default printer is not within the designated area of the computing device; and
   the policy further comprises a security policy directive to scan one or more portions of the document for sensitive information by scanning the one or more portions for at least one of a particular word and a particular phrase;
   determining that the default printer is not within the designated area of the computing device;
   performing a scan as directed by the security policy directive and determining, based on a result of the scan, that the document includes sensitive information; and
   based on the policy, and in response to determining both that the default printer is not within the designated area of the computing device and that the document includes the sensitive information, presenting the user with a verification prompt that cautions the user that the default printer is not within the designated area of the computing device and allows the user to:
   affirmatively select the default printer to print the document; or
   select a different printer to print the document.

2. The computer-implemented method of claim 1, wherein determining that the default printer is not included within the designated area comprises determining that the default printer is not within the computing device's local area network.

3. The computer-implemented method of claim 2, wherein determining that the default printer is not within the computing device's local area network comprises:
   identifying a range of IP addresses associated with the computing device's local area network; and
   determining that an IP address of the default printer falls outside the range of IP addresses associated with the computing device's local area network.

4. The computer-implemented method of claim 3, wherein identifying the range of IP addresses associated with the computing device's local area network comprises:
   identifying an IP address of the computing device; and
   defining the range of IP addresses as IP addresses that are within a predetermined distance from the IP address of the computing device.

5. The computer-implemented method of claim 1, further comprising:
   after presenting the user with the verification prompt, receiving digital input from the user that includes a selection of a different printer for printing the document; and
   in response to receiving the digital input, transmitting instructions to print the document to the different printer instead of transmitting the instructions to the default printer.

6. The computer-implemented method of claim 1, further comprising:
   after presenting the user with the verification prompt, receiving digital input from the user that includes a selection of the default printer for printing the document; and
   in response to receiving the digital input, transmitting instructions to print the document to the default printer.

7. The computer-implemented method of claim 1, wherein:
   the policy to verify the default printer selection whenever the default printer is not within the designated area comprises a policy to only verify the default printer selection if both:
   the default printer is not within the designated area of the computing device; and
   the scan identifies sensitive information.

8. The computer-implemented method of claim 1, further comprising:
   determining that the default printer is located in a location that has been designated as potentially unsafe; and
   performing the identifying, determining, performing, and presenting steps in response to determining that the default printer is located in the location that has been designated as potentially unsafe.

9. The computer-implemented method of claim 1, further comprising:
   upon receiving the digital request, determining that the document includes more than a threshold number of pages to be printed; and
   performing the identifying, determining, performing, and presenting steps in response to determining that the document includes more than the threshold number of pages to be printed.

10. The computer-implemented method of claim 1, wherein:
    the computing device comprises a mobile computing device; and
    the digital request comprises a request to wirelessly transmit instructions to the default printer for the default printer to print the document.

11. A system for automatically verifying default printing selections, the system comprising:
    a receiving module, stored in memory, that receives a digital printing request from a user of a computing device to print a document;
    an identification module, stored in memory, that:
    identifies, in response to receiving the digital printing request, a default printer to which the computing device is configured to transmit instructions to print the document; and
    identifies a policy, wherein:
    the policy comprises a printer-selection directive to:
    automatically print to the default printer without requesting a user verification whenever the default printer is within a designated area of the computing device; and
    verify a default printer selection prior to printing to the default printer whenever the default printer is not within the designated area of the computing device; and
    the policy further comprises a security policy directive to scan one or more portions of the document for sensitive information by scanning the one or more portions for at least one of a particular word and a particular phrase;

a determination module, stored in memory, that:
determines that the default printer is not within the designated area of the computing device;
performs a scan as directed by the security policy directive; and
determines, based on a result of the scan, that the document includes sensitive information;
a presenting module, stored in memory, that, based on the policy, and in response to the determination module determining both that the default printer is not within the designated area of the computing device and that the document includes the sensitive information, presents the user with a verification prompt that cautions the user that the default printer is not within the designated area of the computing device and allows the user to:
affirmatively select the default printer to print the document; or
select a different printer to print the document; and
at least one physical processor configured to execute the receiving module, the identification module, the determination module, and the presenting module.

12. The system of claim 11, wherein the determination module determines that the default printer is not included within the designated area by determining that the default printer is not within the computing device's local area network.

13. The system of claim 12, wherein the determination module determines that the default printer is not within the computing device's local area network by:
identifying a range of IP addresses associated with the computing device's local area network; and
determining that an IP address of the default printer falls outside the range of IP addresses associated with the computing device's local area network.

14. The system of claim 13, wherein the determination module identifies the range of IP addresses associated with the computing device's local area network by:
identifying an IP address of the computing device; and
defining the range of IP addresses as IP addresses that are within a predetermined distance from the IP address of the computing device.

15. The system of claim 11, wherein:
the presenting module receives digital input from the user, after presenting the user with the verification prompt, that includes a selection of a different printer for printing the document; and
the system further comprises a transmission module, stored in memory and executed by the physical processor, that, in response to the presenting module receiving the digital input, transmits instructions to print the document to the different printer instead of transmitting the instructions to the default printer.

16. The system of claim 11, wherein:
the presenting module receives digital input from the user, after presenting the user with the verification prompt, that includes a selection of the default printer for printing the document; and
the system further comprises a transmission module, stored in memory and executed by the physical processor, that, in response to the presenting module receiving the digital input, transmits instructions to print the document to the default printer.

17. The system of claim 11, wherein the policy to verify the default printer selection whenever the default printer is not within the designated area comprises a policy to only verify the default printer selection if both:
the default printer is not within the designated area of the computing device; and
the scan identifies sensitive information.

18. The system of claim 11, wherein:
the receiving module further determines that the default printer is located in a location that has been designated as potentially unsafe; and
the identifying, determining, performing, and presenting steps are performed in response to the receiving module determining that the default printer is located in the location that has been designated as potentially unsafe.

19. The system of claim 11, wherein:
the receiving module, upon receiving the digital request, determines that the document includes more than a threshold number of pages to be printed; and
the identifying, determining, performing, and presenting steps are performed in response to the receiving module determining that the document includes more than the threshold number of pages to be printed.

20. A non-transitory computer-readable medium comprising one or more computer-readable instructions that, when executed by at least one processor of a computing device, cause the computing device to:
receive a digital printing request from a user of the computing device to print a document;
identify, in response to receiving the digital printing request, a default printer to which the computing device is configured to transmit instructions to print the document;
identify a policy wherein:
the policy comprises a printer-selection directive to:
automatically print to the default printer without requesting a user verification whenever the default printer is within a designated area of the computing device; and
verify a default printer selection prior to printing to the default printer whenever the default printer is not within the designated area of the computing device; and
the policy further comprises a security policy directive to scan one or more portions of the document for sensitive information by scanning the one or more portions for at least one of a particular word and a particular phrase;
determine that the default printer is not within the designated area of the computing device;
perform a scan as directed by the security policy directive and determine, based on a result of the scan, that the document includes sensitive information; and
based on the policy, and in response to the determination that both the default printer is not within the designated area of the computing device and that the document includes the sensitive information, present the user with a verification prompt that cautions the user that the default printer is not within the designated area of the computing device and allows the user to:
affirmatively select the default printer to print the document; or
select a different printer to print the document.

* * * * *